(12) United States Patent
Yano et al.

(10) Patent No.: US 7,961,345 B2
(45) Date of Patent: *Jun. 14, 2011

(54) PRINT APPARATUS, CONTROL METHOD THEREOF, AND PRINT SYSTEM

(75) Inventors: Kentaro Yano, Kanagawa (JP); Kazuya Sakamoto, Kanagawa (JP); Takao Aichi, Tokyo (JP); Fumihiro Goto, Kanagawa (JP); Shinjiro Hori, Kanagawa (JP); Akitoshi Yamada, Kanagawa (JP); Tatsuya Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/837,112

(22) Filed: Jul. 15, 2010

(65) Prior Publication Data

US 2010/0277766 A1 Nov. 4, 2010

Related U.S. Application Data

(63) Continuation of application No. 10/449,074, filed on Jun. 2, 2003, now Pat. No. 7,773,244.

(30) Foreign Application Priority Data

Jun. 4, 2002 (JP) ................................. 2002-163434

(51) Int. Cl.
| | |
|---|---|
| *G06F 3/12* | (2006.01) |
| *G06K 15/00* | (2006.01) |
| *H04N 1/00* | (2006.01) |
| *H04N 5/225* | (2006.01) |
| *H05N 5/76* | (2006.01) |

(52) U.S. Cl. ...................... 358/1.15; 358/1.14; 358/1.16; 358/1.6; 358/1.1; 348/207.2; 348/231.1; 348/231.9; 348/211.1; 348/231.5

(58) Field of Classification Search ........................ None
See application file for complete search history.

(56) References Cited

U.S. PATENT DOCUMENTS

| | | | |
|---|---|---|---|
| 6,085,253 | A | 7/2000 | Blackwell et al. |
| 6,104,886 | A | 8/2000 | Suzuki et al. |
| 6,115,137 | A | 9/2000 | Ozawa et al. |
| 6,120,129 | A | 9/2000 | Iwasaki et al. |
| 6,145,950 | A | 11/2000 | Ohtsuka et al. |
| 6,166,826 | A | 12/2000 | Yokoyama |
| 6,288,800 | B1 | 9/2001 | Izumi |

(Continued)

FOREIGN PATENT DOCUMENTS

EP 0 883 276 B1 8/2008

(Continued)

*Primary Examiner* — Twyler L Haskins
*Assistant Examiner* — Hilina S Kassa
(74) *Attorney, Agent, or Firm* — Fitzpatrick, Cella, Harper & Scinto

(57) ABSTRACT

A sensed image is saved in a printer in an environment in which a digital camera can directly communicate with a printer, and the sensed image can be directly printed. A printer and a digital camera (DSC) can be directly connected to each other via a USB interface. Upon this direct connection, the digital camera and printer serve as a print system, and the DSC serves as a user interface in that system. When the user inputs a print instruction of a desired image on the DSC, a print process of that image is executed. When the user inputs a save instruction of a given image, that image is saved in a storage device in the printer. Even when the image is erased on the DSC side, original image data can be prevented from being lost.

8 Claims, 15 Drawing Sheets

U.S. PATENT DOCUMENTS

| | | |
|---|---|---|
| 6,394,571 B1 | 5/2002 | Yano et al. |
| 6,504,960 B2 | 1/2003 | Takahashi |
| 6,535,298 B2 | 3/2003 | Winter et al. |
| 6,552,743 B1 | 4/2003 | Rissman |
| 6,559,963 B1 | 5/2003 | Kamimura |
| 6,577,338 B1 | 6/2003 | Tanaka et al. |
| 6,603,506 B2* | 8/2003 | Ogawa et al. .............. 348/207.2 |
| 6,612,760 B2 | 9/2003 | Ueda et al. |
| 6,655,284 B1 | 12/2003 | Hoshii et al. |
| 6,683,999 B2* | 1/2004 | Ito et al. ........................ 382/305 |
| 6,724,502 B1 | 4/2004 | Miyake et al. |
| 6,806,978 B1 | 10/2004 | Tamura et al. |
| 6,856,425 B2* | 2/2005 | Ozawa et al. .................. 358/1.6 |
| 6,860,578 B2 | 3/2005 | Yamada et al. |
| 6,867,882 B1* | 3/2005 | Takahashi ...................... 358/1.6 |
| 6,886,056 B2 | 4/2005 | Ohmura |
| 6,937,356 B1* | 8/2005 | Ito et al. ........................ 358/1.16 |
| 6,948,792 B2* | 9/2005 | Narusawa et al. .............. 347/19 |
| 6,950,125 B1* | 9/2005 | Sato ........................... 348/207.2 |
| 6,975,423 B2 | 12/2005 | Koakutsu et al. |
| 6,976,084 B2* | 12/2005 | Pineau et al. .................. 709/232 |
| 6,977,680 B1 | 12/2005 | Ichihara |
| 7,023,575 B1 | 4/2006 | Ichihara |
| 7,057,745 B1 | 6/2006 | Tanaka et al. |
| 7,142,318 B2 | 11/2006 | Lopez et al. |
| 7,212,229 B2* | 5/2007 | Parulski et al. ............. 348/207.2 |
| 7,414,746 B2 | 8/2008 | Tanaka et al. |
| 7,773,244 B2* | 8/2010 | Yano et al. .................... 358/1.15 |
| 2002/0051065 A1 | 5/2002 | Takahashi |
| 2002/0071035 A1 | 6/2002 | Sobol |
| 2003/0020945 A1 | 1/2003 | Lopez et al. |
| 2003/0222985 A1 | 12/2003 | Goto et al. |
| 2003/0231341 A1 | 12/2003 | Aichi et al. |
| 2004/0041865 A1 | 3/2004 | Yano et al. |

FOREIGN PATENT DOCUMENTS

| | | |
|---|---|---|
| JP | 10-341327 A | 12/1998 |
| JP | 11-212738 A | 8/1999 |
| JP | 11-227286 A | 8/1999 |
| JP | 2000-174940 A | 6/2000 |
| JP | 2000-253343 A | 9/2000 |
| JP | 2000-354218 A | 12/2000 |
| JP | 2001-105667 A | 4/2001 |
| JP | 2001-306376 A | 11/2001 |
| JP | 2002-116998 A | 4/2002 |

* cited by examiner

PRINT APPARATUS, CONTROL METHOD THEREOF, AND PRINT SYSTEM

This application is a continuation of U.S. patent application Ser. No. 10/449,074, filed Jun. 2, 2003.

FIELD OF THE INVENTION

The present invention relates to a print apparatus and system, which can directly communicate with a digital camera. Note that some recent digital cameras have a function of sensing a moving image. However, since the basic function of a digital camera is at least a still image photographing function, apparatuses having the above function will also be called a digital camera (DSC).

BACKGROUND OF THE INVENTION

Normally, upon printing an image sensed by a digital camera, the following processes are required. That is, an image stored in the digital camera is read by a personal computer (to be referred to as a PC hereinafter), and is printed by a connected printer using an application running on the PC.

That is, the flow of image data is DSC→PC→printer, and possession of the PC is indispensable. Also, the PC must be started to print an image stored in a DSC.

In consideration of such situation, some proposals in which a DSC and printer are directly connected, and a print instruction is issued on a display normally equipped on the DSC (to be referred to as photo direct print hereinafter) have already been made.

Merits of use of the photo direct print system are easy print without starting a PC and low system building cost since a PC is not indispensable. Upon connecting a DSC to a printer, a display normally equipped on the DSC is used as means for giving various instructions and, especially, for confirming an image to be printed. Hence, a printer does not require any special display used to confirm an image, and the cost can be further reduced.

In general, a DSC stores a sensed image in a detachable memory card (called a CF card, smart media card, or the like). Such memory card has a storage size of, e.g., about 64 MB or 128 MB, and stores several ten to 100 images since the resolution of recent DSCs is as high as several million pixels.

In other words, when the maximum number of images that can be stored is reached, a new image cannot be sensed unless a free area is assured by erasing some or all stored images.

Therefore, important images must be printed before they are erased. However, if image data as sources of printouts are erased, those original image data can never again be used (an image scanner may be used, but an image having quality as high as digital data as a 100% original image cannot be restored).

A PC user can store those images in a hard disk of the PC, but a user who does not possess any PC cannot do it. Even for the PC user, he or she must connect a DSC to a printer and to a PC, resulting in troublesome operations.

SUMMARY OF THE INVENTION

The present invention has been made in consideration of the aforementioned problems, and has as its object to provide a print apparatus which can save and print image data sensed by a digital camera by substantially the same operations in a printer that can directly communicate with a digital camera, a control method thereof, and a print system.

In order to achieve the above object, a print apparatus according to the present invention comprises the following arrangement.

That is, a print apparatus for printing an image on a print medium, comprises:

communication means for directly communicating with a digital camera;

storage means for saving image data; and saving means for, when the printer apparatus can directly communicate with the digital camera via the communication means, writing and saving sensed images which are stored and held by the digital camera in the storage means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described hereinafter with reference to the accompanying drawings.

<Basic Arrangement>

A basic part in this embodiment will be explained below. In the following description, a system in which an image stored in a storage medium of a digital camera (DSC) is printed in an environment in which a printer can directly communicate with the DSC will be referred to as a photo direct print system.

Figure 1:
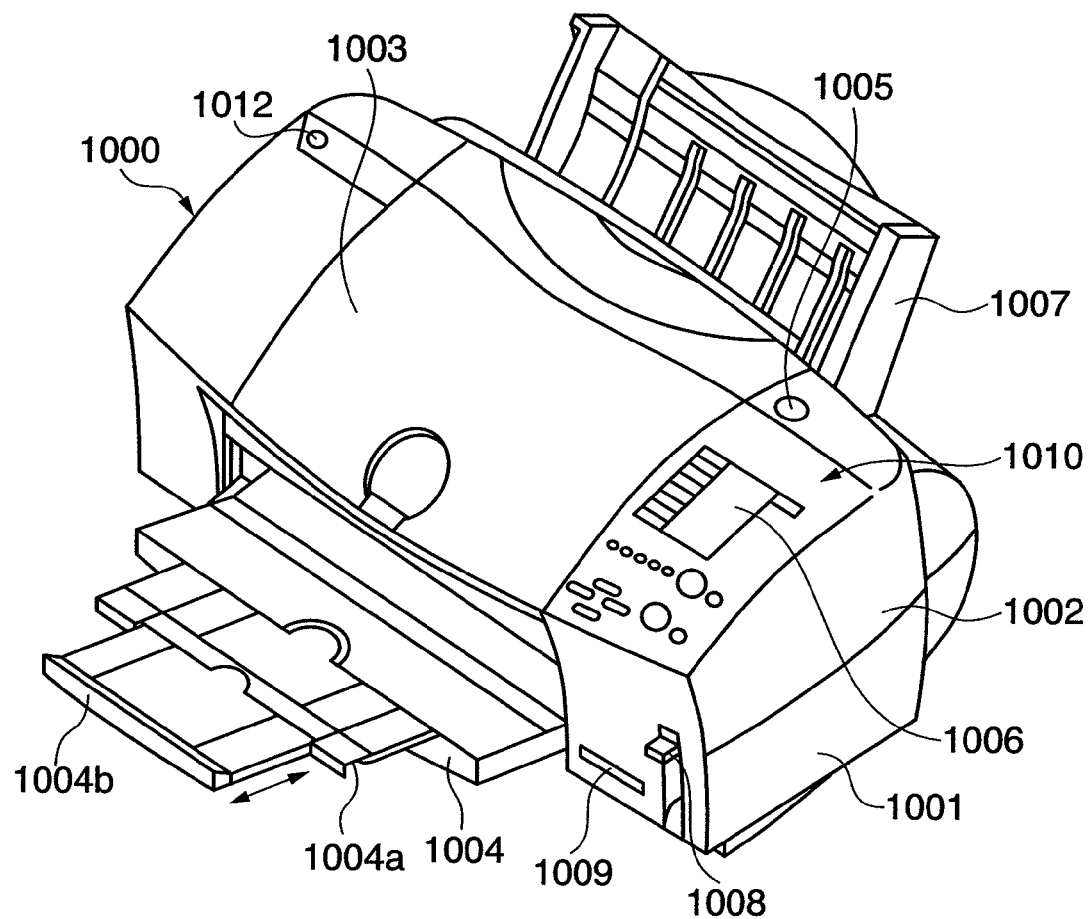
FIG. 1 is a perspective view showing the outer appearance of a print apparatus according to an embodiment of the present invention.
Figure 2:
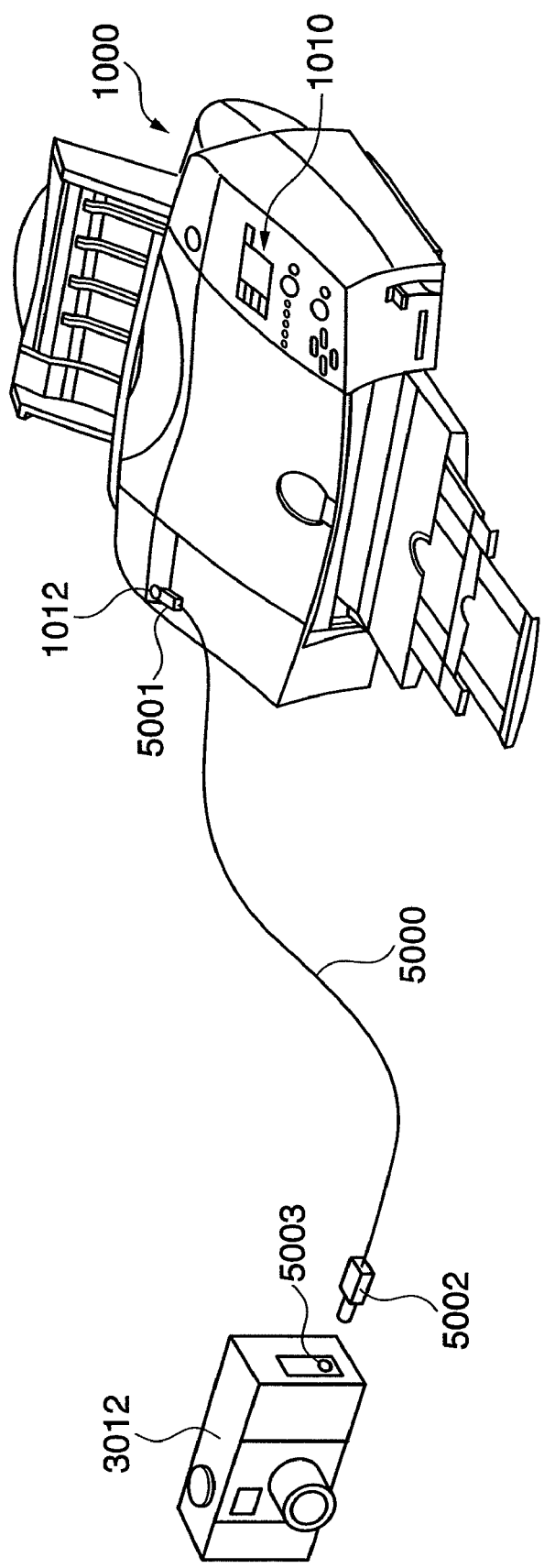
FIG. 2 is a view showing a case wherein a digital camera and print apparatus are connected according to the embodiment of the present invention.

FIG. 1 shows the outer appearance of a photo direct printer (to be referred to as a PD printer hereinafter) in this embodiment, and FIG. 2 shows a state wherein a DSC is directly connected to the printer.

Referring to FIG. 1, this PD print apparatus 1000 has a function of printing data received from a host computer (PC) as a normal PC printer, and a function of printing image data directly read from a storage medium such as a memory card or the like or printing image data received from a digital camera.

A main body which forms a housing of the PD print apparatus 1000 according to this embodiment has a lower case 1001, upper case 1002, access cover 1003, and exhaust tray 1004 as an exterior member. The lower case 1001 nearly forms the lower half portion of the main body, and the upper case 1002 nearly forms the upper half portion of the main body. By combining these cases, a hollow structure which has a storage space that stores mechanisms to be described later is formed. Openings are respectively formed on the upper and front surfaces of the main body. Furthermore, one end portion of the exhaust tray 1004 is rotatably held by the lower case 1001, and rotation of the tray 1004 opens/closes the opening formed on the front surface of the lower case 1001. For this reason, upon making the print apparatus 1000 execute a print process, the exhaust tray 1004 is rotated toward the front surface side to open the opening, so that print sheets can be exhausted from the opening. The exhausted print sheets are stacked on the exhaust trays 1004 in turn. The exhaust tray 1004 stores two auxiliary trays 1004a and 1004b, and when these auxiliary trays are pulled out as needed, the loading area of print sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover can be detected.

A power key 1005 is arranged on the upper surface of the upper case 1003 so the user can press it. A control panel 1010 which comprises various key switches, and the like is provided on the upper case 1002. Reference numeral 1007 denotes an automatic feeder which automatically conveys a print sheet into the apparatus main body. Reference numeral 1008 denotes a paper gap select lever which is used to adjust the gap between the printhead and print sheet. Reference numeral 1009 denotes a card slot which receives an adapter that can receive a memory card. As this memory card (PC), for example, a Compact Flash Card®, Smart Media Card®, Memory Stick®, and the like are available. Reference numeral 1012 denotes a terminal used to connect a digital camera (to be described later). Since the digital camera normally adopts USB (Universal Serial Bus) as means for connecting a personal computer (PC), this embodiment adopts a USB interface as the terminal 1012. Of course other communication means may be used. In order to facilitate connection to the digital camera, front access is allowed, as shown in FIG. 1.

On the other hand, the PD print apparatus 1000 also comprises an interface which can realize a print process from a personal computer (PC). Normally, once the print apparatus is connected to the PC, that connection state is maintained under normal circumstances. Hence, that interface terminal is provided to the back surface of the print apparatus. This connection interface with the PC is not particularly limited and may adopt a Centronics parallel interface, USB interface, or the like. However, this interface supports at least a two-way communication function.

FIG. 2 shows the connection state of the PD print apparatus 1000 and a digital camera 3012 according to this embodiment.

Referring to FIG. 2, a cable 5000 (USB cable) comprises a connector 5001 which is connected to the connector 1012 of the PD print apparatus 1000, and a connector 5002 which is connected to a connector 5003 of the digital camera 3012. When the digital camera 3012 is connected to a PC, sensed images can be transferred to the PC by connecting the connector 5001 to a USB connector of the PC.

The digital camera 3012 can output image data saved in its internal memory via the connector 5003. Note that the digital camera 3012 can adopt various arrangements, e.g., an arrangement that comprises an internal memory as storage means, an arrangement that comprises a slot for receiving a detachable memory, and so forth. When the PD print apparatus 1000 and digital camera 3012 are connected via the cable 5000 shown in FIG. 2, image data output from the digital camera 3012 can be directly printed by the PD print apparatus 1000.

Figure 3:
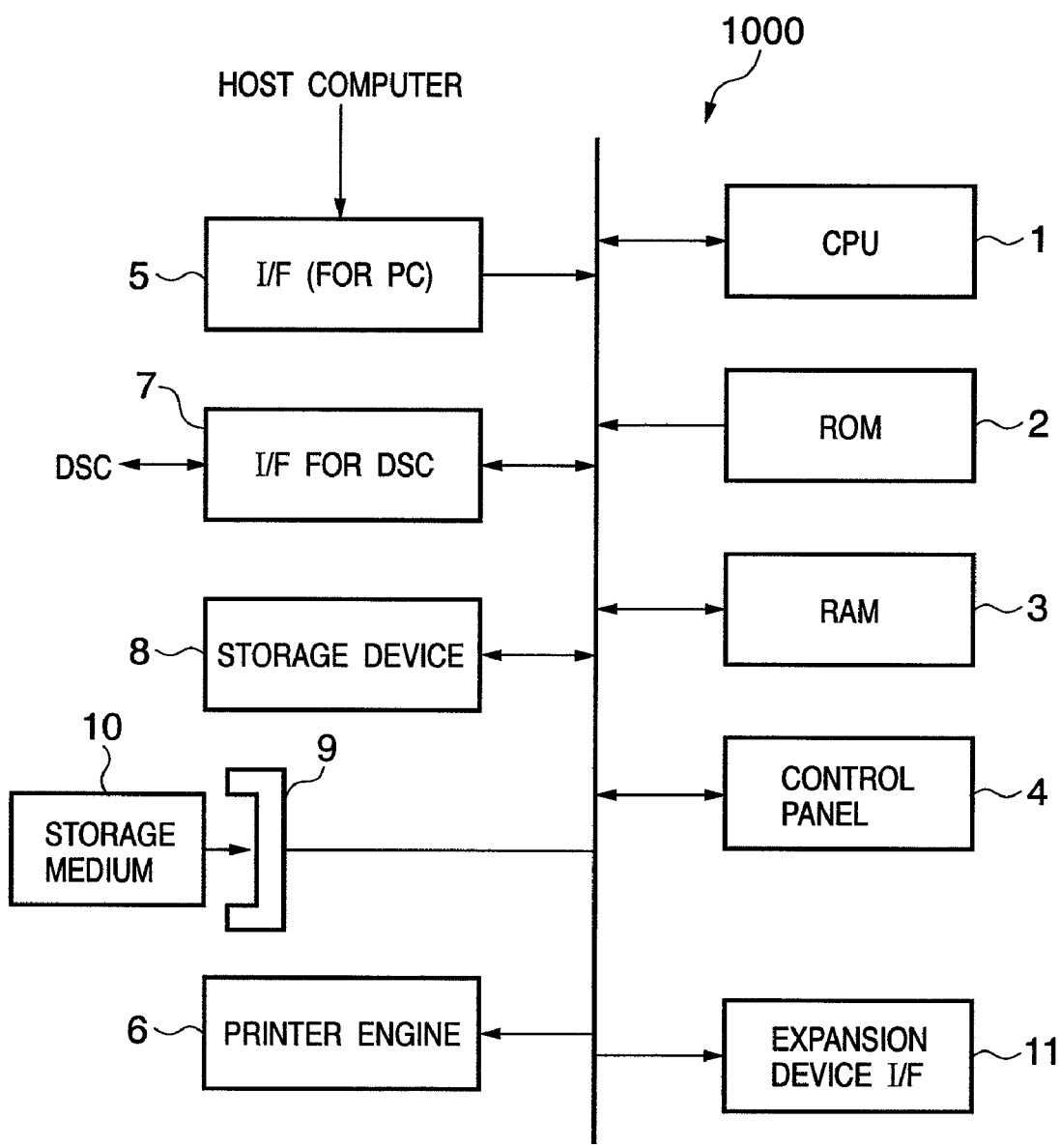
FIG. 3 is a block diagram of a printer apparatus according to the embodiment of the present invention.

FIG. 3 is a block diagram of a control system of the PD printer 1000 in this embodiment.

Referring to FIG. 3, reference numeral 1 denotes a CPU for controlling the overall apparatus; 2, a ROM which stores the operation processing sequence (program) of the CPU 1 and font data; and 3, a RAM used as a work area of the CPU 1. Reference numeral 4 denotes a control panel (corresponding to 1010 in FIG. 1). Reference numeral 5 denotes an interface used to connect the PC; and 7, an interface used to connect a digital still camera (USB host side). Reference numeral 8 denotes a large-capacity storage device, which is a nonvolatile device such as a hard disk, MO, or the like that has a drive system for rotating a storage disk and has low unit memory cost. Reference numeral 9 denotes a card interface which can connect an adapter (PCMCIA) 10 that mounts a memory card. Reference numeral 6 denotes a printer engine. In this embodiment, a print engine which ejects ink using heat energy is adopted. However, the present invention is not limited to such specific print system. Reference numeral 11 denotes an interface used to connect an expansion device. As will be described in detail later, a display device which is prepared as an option and is used to display an image can be connected to the interface 11.

Figure 4:
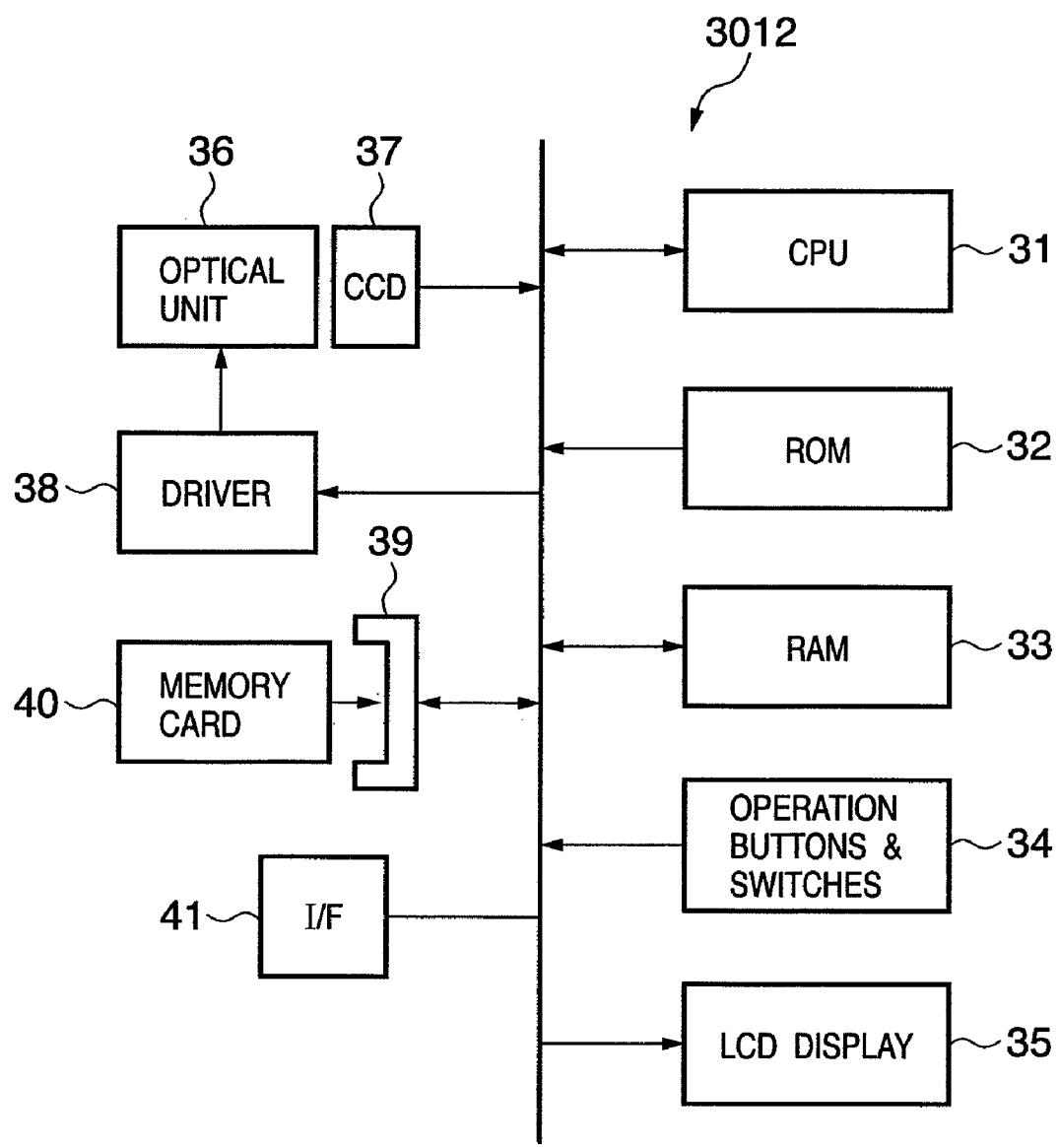
FIG. 4 is a block diagram of a digital camera according to the embodiment of the present invention.

FIG. 4 is a block diagram of the DSC (digital still camera) 3012. Referring to FIG. 4, reference numeral 31 denotes a CPU which controls the overall DSC; and 32, a ROM that stores the processing sequence of the CPU 31. Reference numeral 33 denotes a RAM which is used as a work area of the CPU 31; and 34, a switch group used to make various operations. Reference numeral 35 denotes a liquid crystal display, which is used to confirm a sensed image, and to display a menu upon making various setups. Reference numeral 36 denotes an optical unit which mainly comprises a lens and its drive system. Reference numeral 37 denotes a CCD element; and 38, a driver which controls the optical unit 36 under the control of the CPU 31. Reference numeral 39 denotes a connector that connects a storage medium 40 (compact flash memory card, smart media card, or the like); and 41, a USB interface (USB slave side) used to connect the PC or PD printer 1000 of this embodiment.

The arrangements of the PD printer and DSC of this embodiment have been explained. An embodiment based on these arrangements will be explained below.

In general, the DSC compresses a sensed image and saves that compressed image in the detachable storage medium 40. The storage medium has a size of about 64 MB or 128 MB at most. Hence, the storage medium prepares for a new photographing operation by erasing stored images or reformatting the medium.

If the user possesses a PC, he or she can build an environment that allows reuse of images sensed by the DSC whenever he or she wants by transferring and saving those images in a hard disk in the PC. However, if the user does not possess any PC, images which are printed before erasing the storage medium in the DSC are all he or she has. Hence, such user cannot reuse images as digital data.

Even for the user who possesses a PC, if a photo direct print system is also formed, he or she normally prints without the intervention of the PC in consideration of time and effort. However, when such user wants to save image data as digital data in the DSC in addition to such printouts, he or she must re-connect the DSC to the PC.

Hence, the present inventor provides the aforementioned large-capacity storage device 8 in the PD printer.

With this arrangement, the user can save images sensed by the DSC while utilizing the photo direct print system regardless of whether or not he or she possesses a PC. That is, the print and save processes do not require any re-connection, and all the above problems can be solved.

Preferred embodiments according to the present invention will be explained hereinafter under such concept.

First Embodiment

Figure 5:
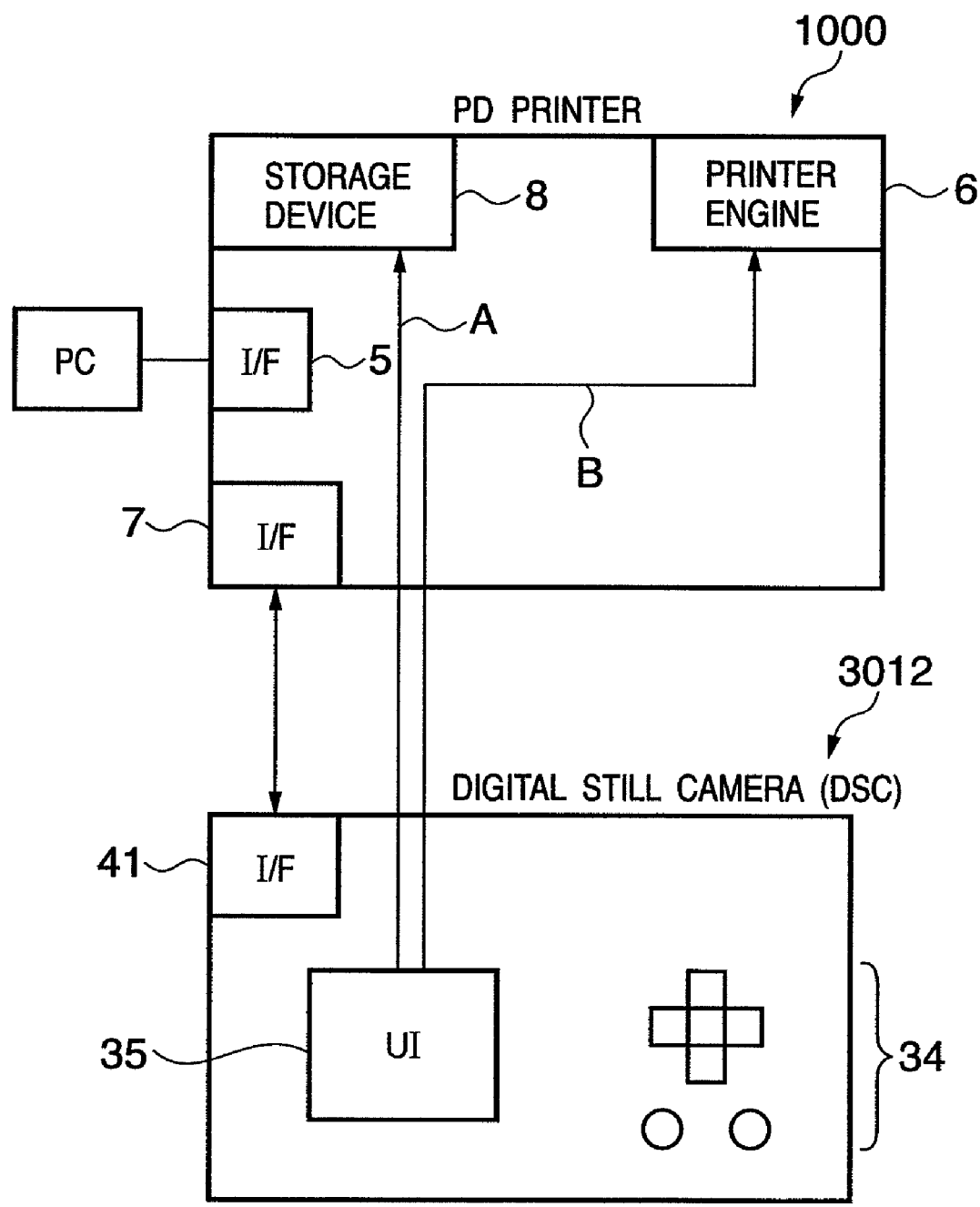
FIG. 5 is a schematic functional diagram in a print system according to the first embodiment of the present invention.

FIG. 5 is a schematic diagram of operation functions upon connecting the DSC 3012 and PD printer 1000 in the first embodiment.

As shown in FIG. 5, in the connection state of the DSC 3012 and PD printer 1000, the user selects on the LCD display 35 of the DSC whether an image is to be printed or stored (saved). If the user wants to save an image, that image is saved in the storage device of the printer 1000 via route A by selecting an image to be saved in turn. On the other hand, if the user selects to print out an image, that image is printed by the print engine 6 of the printer 1000 via route B.

In the state wherein the DSC 3012 is connected to the printer 1000 as in the above arrangement, two operations, i.e., print and save operations of a sensed image, can be done without starting up the PC (or without any PC).

When the DSC 3012 is connected to the PD printer 1000 and an image in the DSC 3012 is to be saved in the storage device 8 of the PD printer, for example, photographing date & time information is used as a file name. For example, when an arbitrary image is taken at 14:37:51, May 27, 2002, a file name used upon saving that image in (the storage device 8 of) the PD printer 1000 is "20020527143751.jpg". As a result, each individual image can have a unique file name.

Assume that the user saves 10 images stored in the DSC 3012 in the PD printer 1000 and then takes new 15 images while holding these images. In this state, when the user connects the DSC to the PD printer again and saves the new images, the PD printer inquires the photographing date & time of each image. As a result, since the photographing date & time of each image is transferred from the DSC 3012, the PD printer can determine whether or not a given image has already been saved. That is, when the user issues a save instruction of a given image on the DSC side, the PD printer acquires the photographing date & time information of that image from the DSC. If an image having the same photographing date & time information is present on the storage device 8, the PD printer does not execute a transfer process of that image from the DSC to the PD printer, and informs the user of completion of that transfer process.

Note that information that designates an image is not limited to the photographing date & time, since it can uniquely designate an image. For example, at least one or a combination of a file name, file size, image format, file creation date & time information, identification value (e.g., a hash value calculated by a hash function) calculated from image data, identification information (e.g., a serial number) assigned by an image information server apparatus or print apparatus, and the like may be used.

In this way, sensed images stored in the storage device 8 of the PD printer 1000 increase. A method of reading out these images from the printer is not particularly limited.

For example, since the PD printer 1000 appears as not only a printer and but also an external storage device when viewed from the PC, the user can freely read out and modify these images from the PC side.

In case of the user who does not possess any PC, if he or she selects "browse" displayed on an initial window of the DSC 3012 upon connecting the DSC to the PD printer, images saved in the PD printer can be displayed on the LCD display 35 in turn, and desired ones of these images can be printed.

Figure 6:
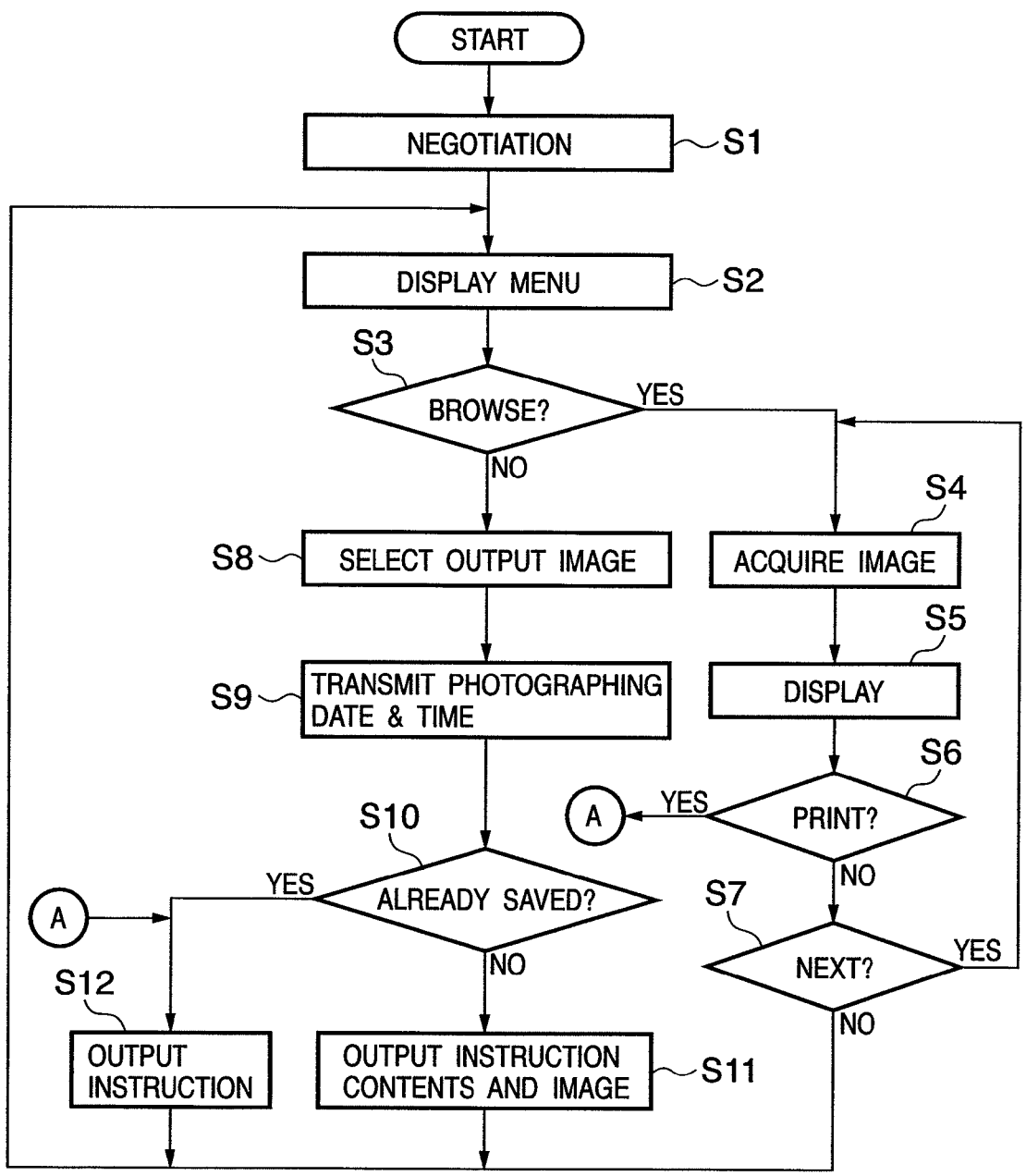
FIG. 6 is a flow chart showing the processing sequence on the digital camera side in the first embodiment.
Figure 7:
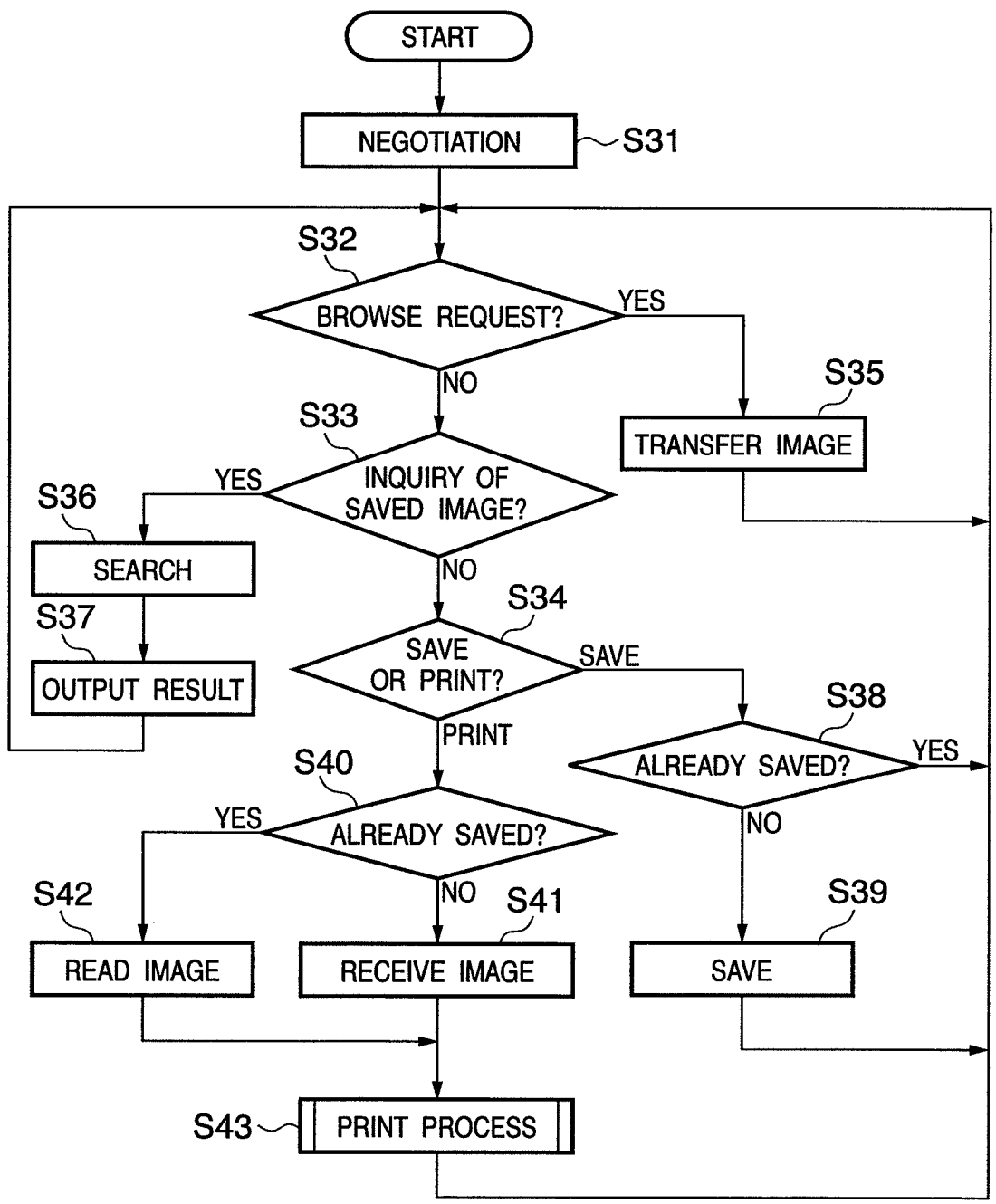
FIG. 7 is a flow chart showing the processing sequence on the print apparatus side in the first embodiment.

In order to implement the above processes, the DSC 3012 can process according to the flow chart in FIG. 6, and the PD printer 1000 can process according to the flow chart in FIG. 7.

The process on the DSC side will be explained first.

When the DSC 3012 is connected to the PD printer 1000 via the USB cable and its power switch is turned on, the DSC detects connection to the printer via the USB interface. Upon detection of that connection, the DSC is switched to serve as a user interface device in the print system of this embodiment (assume that its photographing function is disabled in this state). When the DSC and PD printer are connected, the PD printer serves as the host side to control the DSC.

In step S1, a negotiation process starts. A detailed description of this process will be omitted. In this case, it is checked if each others devices have a photo direct print function.

The flow advances to step S2. In step S2, the DSC displays a default menu window on the liquid crystal display 35 and prompts the user to select whether an image is to be output (saved or printed) to the PD printer or images saved in the PD printer 1000 are to be browsed. This selection is made by operating the switch group 34 equipped on the DSC.

If the user has selected the browse mode, the flow advances to step S4 to acquire an image from the PD printer 1000. In step S5, the acquired image is displayed. It is checked in steps S6 and S7 if a print instruction or a display request of the next image is issued by operating the switch group 34, while the image is displayed. If the print instruction of the currently displayed image is issued, since that image is saved in the PD printer 1000, it need not be re-transferred to the PD printer 1000. Therefore, the flow advances to step S12, and information that specifies the image and a print instruction need only be given.

On the other hand, if the user has selected output of the photographed image to the PD printer 1000, the flow advances to step S8 to determine an image to be output. This image is determined by displaying photographed images in turn and operating one of a print or save instruction switch when a desired image is displayed.

In either case, after the image to be output is determined, the flow advances to step S9 to inform the PD printer 1000 of the photographing date & time information of that image. At this time, the DSC also transfers file information of the image. As a result, the PD printer 1000 checks if an image file having the same photographing date & time information is saved on the basis of received information, and informs the DSC 3012 of the presence/absence of such image having the corresponding photographing date & time information. It should be noted that, if the image file is saved into the storage device of the PD printer 1000 with the name of file named by DSC, the PD printer can check, using the file name transmitted from the DSC, whether or not the designated image file has been saved in the storage device. In step S10, whether or not the image designated by the user has already been saved in the PD printer 1000 can be determined in accordance with this information result. If it is determined that the corresponding image is not saved, the flow advances to step S11 to output instruction contents which indicate a print or save mode, and to output the designated image data to the PD printer. Note that, if the instruction contents indicate the print mode, it is preferable to transmit information indicating a print condition of the image before transmitting the image data, because the PD printer 1000 can control the reading of the image in accordance with the received print condition. For example, if the instruction contents include an instruction of trimming, the PD printer can request the DSC to transmit a trimmed image to be printed. Thus, the PD printer 1000 can recognize a kind of image processing for the image and start recognized image processing at the early stage by that the DSC transmits the instruction of the print condition before the image data. Specifically, when a plurality of images are printed on one sheet, it is possible to save the memory and to shorten the processing time, because the resize processing of each image can begin before the transmission of all images ends.

Referring again to FIG. 6, if it is determined that the output instruction of an image which has already been saved in the PD printer is issued, the instruction contents and information required to specify that image are sent to the PD printer side in step 12.

The processing sequence in the PD printer 1000 will be described below.

Upon connection to the DSC via the USB cable, the PD printer makes negotiation in step S31, requests the DSC to issue an instruction, and shifts in a polling state. Upon reception of an instruction from the DSC, the instruction contents are determined in steps S32 to S34.

If it is determined that the instruction is a browse request, the flow advances to step S35, and the PD printer transfers image data in the storage device 8 to the DSC to allow the DSC to browse an image. After that, every time the browse request is detected, a command contained in that request is interpreted, and the requested image is transferred to the DSC side as long as the requested image is saved.

On the other hand, if it is determined that the instruction is an inquiry that asks if the image on the DSC side has already been saved in the PD printer side, the PD printer searches the storage device 8 for a file having photographing date & time information as a search key contained in that inquiry command, and informs the DSC of the result indicating whether or not the corresponding file is found.

If it is determined that the instruction is a save instruction, the flow advances to step S38. In step S38, the PD printer checks a flag contained in that command to see if an image is appended. If it is determined that an image is appended, the PD printer executes a save process of that image as a new image in step S39, and sends a completion message to the DSC. If it is determined in step S38 that an image designated by the save request has already been saved, the PD printer immediately sends a completion message to the DSC.

If it is determined that the instruction is a print instruction, the PD printer checks if that print instruction designates an already saved image. If it is determined that the print instruction designates an unsaved image, the PD printer receives image data from the DSC (step S41), and executes a print process of that image in step S43. If the print request designates the already saved image (including an image that has already been printed in the browse mode), the corresponding image is read from the storage device, and its print process is executed in step S43.

As described above, according to the first embodiment, in the system which directly connects the digital camera (DSC) and printer 1000, the printer 1000 serves not only as a simple print apparatus but also as an image storage device. Therefore, the user can easily execute print and save processes regardless of whether or not he or she possesses a PC.

In the above embodiment, upon issuing a print instruction of an image which is not saved in the PD printer, that image is output to the PD printer but is not saved. However, unsaved image data may be automatically saved. In this case, an image save process can be executed immediately after step S41.

In some cases, the user may select one of print, save, and print & save modes. In such case, image data need only be transferred only once from the DSC to the printer.

In the above description, the process for determining whether or not an image to be output to the PD printer has already been saved in the PD printer is implemented by determining an image to be output and then transmitting its photographing date & time information from the DSC to the PD printer. However, the present invention is not limited to such specific process.

For example, in the negotiation process executed upon connecting the DSC and PD printer, the PD printer inquires the DSC about how many images are saved. If it is determined as a result of this process that 20 images are saved in the DSC, unique numbers (handlers) are assigned to individual objects, and an object (image) is then exchanged using this handler. Therefore, when the PD printer inquires the DSC of detailed information (containing photographing date & time information) of each individual image, it can determine in advance if objects corresponding to all handlers are already saved images.

For example, when the DSC issues a print request of an image with handle "15", if the PD printer has recognized at that time that the image has already been registered in the storage device 8, it can issue an instruction indicating "print completion or print instruction reception completion" at the time of reception of the request, read out the corresponding image from the storage device 8, and execute its print process. On the other hand, if it is determined that the requested image is not saved in the storage device 8, the PD printer can issue an image transfer request to the DSC, and output "print completion or print instruction reception completion" upon completion of reception of that image. The same applies to the save process in the storage device 8.

However, when the user browses an image saved in the PD printer from the DSC side, a print request of the currently browsed image is processed as follows.

The storage device 8 gradually stores a large number of images. Therefore, if unique handlers are assigned to those images, the number of handles is expected to be huge. However, when the user browses images on the DSC side, the number of images which can be simultaneously displayed on the liquid crystal display of the DSC is 3×3 images at most if they are reduced in size. Hence, identical handlers may be used cyclically. That is, if the display of the DSC is capable of displaying 3×3 images at the same time, nine handlers are generated upon outputting images from the storage device 8 to the DSC, and are appended to the images to be output to the DSC. Upon reception of a browse request of the next nine images, identical handlers are assigned, and corresponding images are output to the DSC. That is, in the browse mode, the PD printer need only manage a maximum of nine handles of images which are output to the DSC to be browsed. Upon determination of an image to be printed, the DSC informs the PD printer of a print command and the handler of that image. Hence, the subsequent process can be the same as that for the print request of the already saved image.

In the negotiation process executed upon connecting the DSC and PD printer, the PD printer may confirm if each of images on the DSC side has already been saved in the storage, and may inform the DSC of that result. Then, the DSC may display that information on its UI (e.g., displays a "saved" mark on the corresponding photo image). As a result, the user can determine photos to be saved.

Alternatively, the same method may be implemented by appending information indicating "saved" to image files held on the DSC side.

Figure 15:
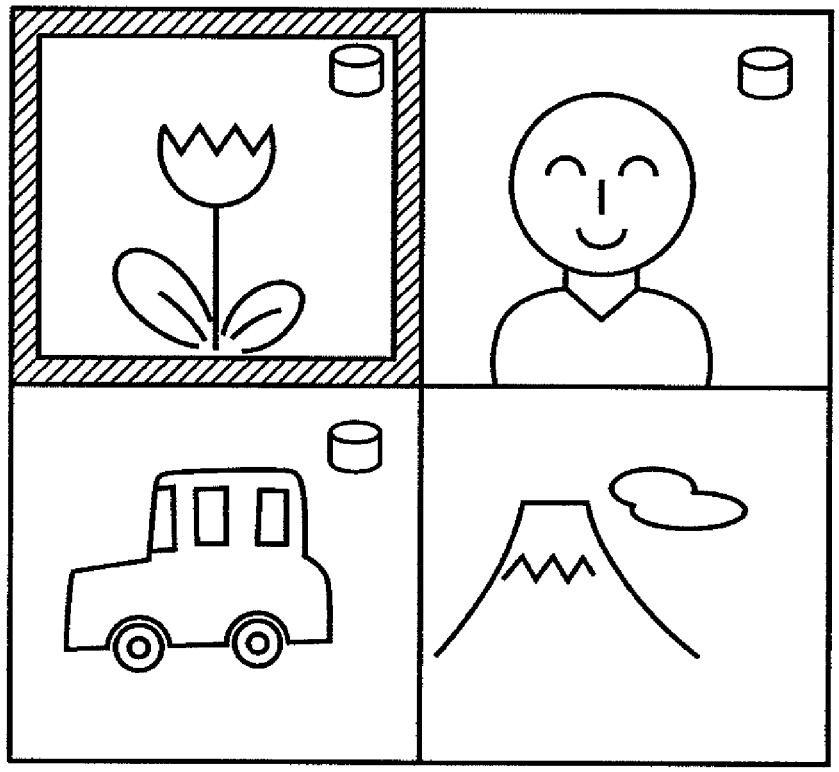
FIG. 15 shows an example of a select window of an image to be output in the digital camera of the embodiment.

For example, a window shown in FIG. 15 may be used. FIG. 15 shows a display example on the display 35 upon selecting an image to be output in the DSC. In case of FIG. 15, 2×2 images are displayed. In FIG. 15, an upper left image with a bold frame indicates that this image is selected at that time. Since the DSC has various operation switches (or buttons), a selected image can be changed using these switches. Finally, the user designates an output purpose (save, print, or save & print) of the selected image. Note that whether or not each individual image has already been saved in the storage device 8 of the PD printer can be determined by a mark indicating this upon displaying the image. Note that FIG. 15 shows a display example of 2×2 images. However, 3×3 images may be displayed, or only one image may be displayed.

In the above embodiment, the storage device 8 has been exemplified as storage means for saving (storing) images. Alternatively, a storage medium (e.g., a CF card, smart media card, or the like) which can be connected to the PD printer may be used, or both the storage device and storage medium may be used. However, a rotary mass storage device such as a hard disk or the like is preferably used since it can store a large number of images and has very low memory unit cost. In the above description, the storage device 8 is incorporated in the printer, but may be connected externally. However, since the printer normally has a sufficiently large storage space, and a storage device requires a power supply cable and the like if it is connected externally, the printer preferably incorporates the storage device. The same applies to embodiments to be described below.

Upon printing a saved image, identification information (file name, serial number or the like) which specifies the file of that image is preferably printed together at an appropriate position of that printout. As a result, when the user wants to print a printed image again, he or she can designate that identification information by operating the console of the PD printer, and can print that image without connecting the DSC again.

As described above, the PD printer of this embodiment is connected to the host computer and serves as a normal printer, and the storage device 8 of the PD printer also serves as an external storage device for the host computer. Therefore, when the PD printer of this embodiment is connected to the host computer in operation, if the DSC is connected to the PD printer, access from the host computer is preferably inhibited during write access of image data from the DSC to the storage device 8. For this purpose, for example, a process for inhibiting access from the host computer may be executed immediately before step S39 in FIG. 7, and a process for permitting access may be executed immediately after step S39.

Second Embodiment

In the first embodiment, whether to print or save an image is selected on the DSC (digital still camera) side. However, such selection may be made on the PD printer side.

Figure 8:
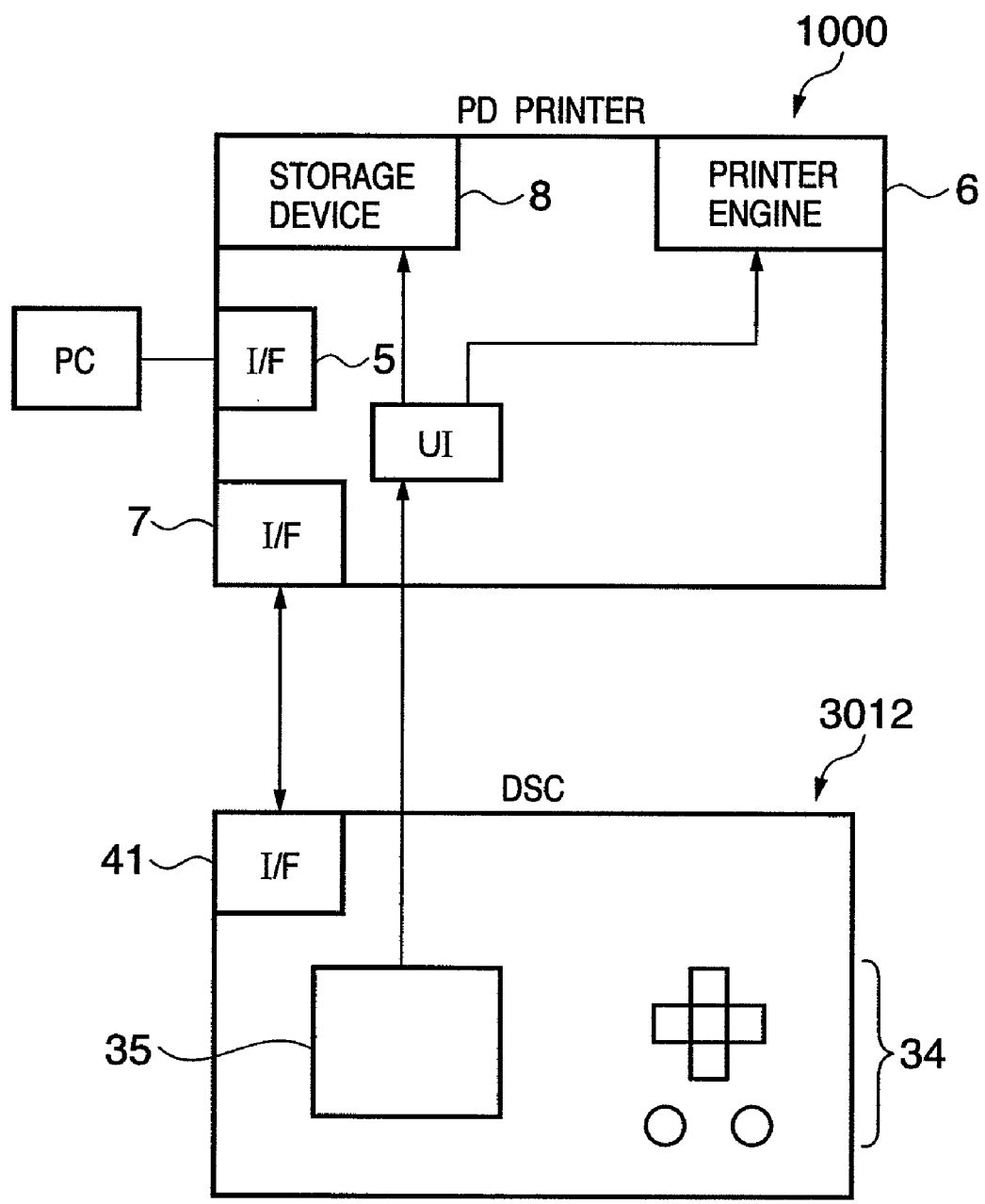
FIG. 8 is a schematic functional diagram in a print system according to the second embodiment of the present invention.

Since the hardware arrangements of the PD printer and DSC are the same as those in the first embodiment, a description thereof will be omitted, and FIG. 8 is a schematic functional diagram of the second embodiment.

As shown in FIG. 8, the DSC side has a function of simply outputting an image in response to a request from an external device (which may be either a PC or PD printer), i.e., an inevitable function of a DSC which comprises a USB interface.

When save and print processes are to be executed on the PD printer side, the PD printer must have a function of displaying each individual image even at a low resolution so as to confirm a process to be executed for that image.

A case will be explained below wherein a display device (not shown) is connected to the expansion device interface 11 shown in FIG. 11.

When the DSC 3012 is connected to the PD printer 1000, one or 3×3 images of those held by the DSC 3012 are transferred to the PD printer 1000, which displays these images on its display device, and prompts the user to set processes for desired ones of the displayed images. As the setup contents, as described above, one of the print, save, or print & save mode of a target image is designated.

When the save mode is designated, the save process in the storage device 8 is executed. When the print mode is designated, the output process to the printer engine 6 is executed. When the print & save mode is designated, both the save and print processes are executed.

When the DSC is connected to the PD printer, and a process to be executed is selected on the UI of the PD side, the DSC may hold an image, which has already been saved in the PD printer. Therefore, the already saved image is not output from the DSC to the PD printer but is read out from the storage device 8 of the PD printer and is displayed. As a result, the data size of an image to be transmitted from the DSC to the PD printer can be reduced, and an image to be selected by the user can be consequently updated quickly. Whether or not an image has already been saved may be determined based on its photographing date & time information, as in the above embodiment.

As described above, according to the second embodiment, the user can issue print and save instructions as he or she wants while the digital camera and printer are directly connected, as in the first embodiment.

In the second embodiment, a desired one of previously saved images can be printed by operating the display and switch group of the PD printer.

However, according to the second embodiment, since the display device for displaying images as an optional device must be additionally purchased, cost increases inevitably. Therefore, it is preferable to designate a printout or save mode using the aforementioned first embodiment, i.e., the user interface of the digital camera. This is because upon adopting the first embodiment, the digital camera requires only addition of software, in other words, the first embodiment can be implemented by only updating the firmware version.

<Modification>

An example wherein a print process is executed using the UI on the DSC, and the storage on the printer side is utilized will be explained.

More specifically, the storage is incorporated in or externally connected to the printer, and the DSC has a normal direct connect print function but does not have any storage instruction function. As operations at that time, 1. The user selects a mode "print/save/print & save" using a UI/select switch or the like on the printer. (Firmware may automatically determine the mode in accordance with status of the storage function.)

2. The user makes a direct connect print operation using the UI on the DSC (old model).

3. The printer prints and/or saves incoming image information on the basis of the setup contents of 1.

As described above, even a DSC of old model, which has no storage instruction function, can enjoy a merit of the storage function. Also, a cache function (to be described later) and the like can be similarly utilized. When the DSC side has a storage instruction function (which can be determined in the initial negotiation process), since the DSC side can issue instructions of print, save and the like, it is often preferable to turn off (disable) the function on the PD printer side of this embodiment, i.e., the mode select function of selecting whether or not an image is to be saved using the UI on the PD printer side, and to preferentially process an instruction from the DSC.

Third Embodiment

In the first and second embodiments, the PD printer is provided with a function of saving (storing) images sensed by the DSC, and print and save (storage) processes of sensed images are implemented by a simple system, i.e., a combination of the DSC and PD printer. In the third and subsequent embodiments, evolved examples of the above embodiments will be explained.

In general, since a printer operates based on a power supply from an AC outlet, there is no need to give attention to its power supply. On the other hand, a digital camera is driven by a battery since it must be usable anywhere wanted by the user.

Therefore, the system in which the digital camera is directly connected to the printer must take precaution against battery shutoff. More specifically, when the battery of the DSC has run out during output of one image frame designated on the DSC side by the printer, the print process is aborted in the middle, and a print sheet and inks of the printer are wasted accordingly.

In case of USB connection, since consumption power during data transfer is not negligible, the connection time with the printer while the power supply of the DSC is ON is preferably shorter, and risks of battery shutoff can then be lowered accordingly.

The third embodiment solves such problem.

Figure 9:
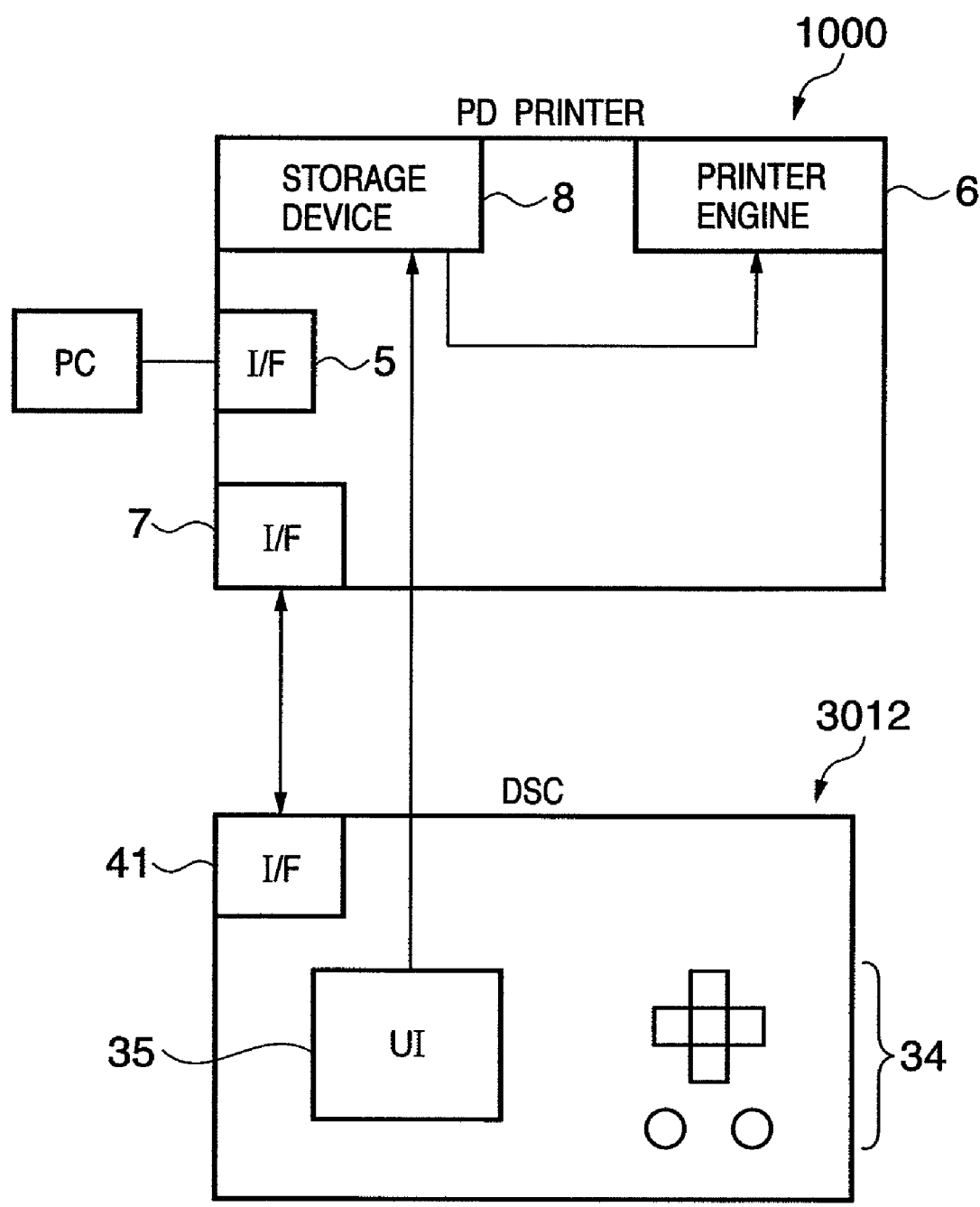
FIG. 9 is a schematic functional diagram in a print system according to a modification of the second embodiment of the present invention.

FIG. 9 is a schematic functional diagram of the third embodiment. As shown in FIG. 9, in the initial stage of connection of the DSC to the PD printer, images stored in (the storage medium 40 of) the DSC are unconditionally transferred to the storage device 8. In other words, upon detection of connection with the DSC, the PD printer 1000 sends read requests of all images stored in the DSC 3012, and stores them in the storage device 8. Since correspondence between an image designated by a print instruction on the DSC side and that saved in the storage device 8 must be specified later, unique handlers are assigned to images upon (before) transfer.

Since images are simultaneously transferred, it is advantageous to reduce the overhead upon transfer can be reduced, and to make data transfer while nearly fully using the USB bandwidth.

Furthermore, every time the user selects one image to be printed on the DSC side, a print instruction may be issued. Alternatively, the user selects images to be printed in turn, and a print instruction of these images is finally issued. As a result, a list (script) that describes a plurality of images to be printed can be supplied to the PD printer. Upon completion of these operations, even if the battery of the DSC has run out, the PD printer has already received information about images to be printed, and these images has already been cached on the storage device 8. Therefore, originally scheduled print processes of a plurality of images can be executed.

The hardware arrangements of the PD printer and DSC are the same as those in FIGS. 3 and 4, and their processing sequences will be described below.

Figure 10:
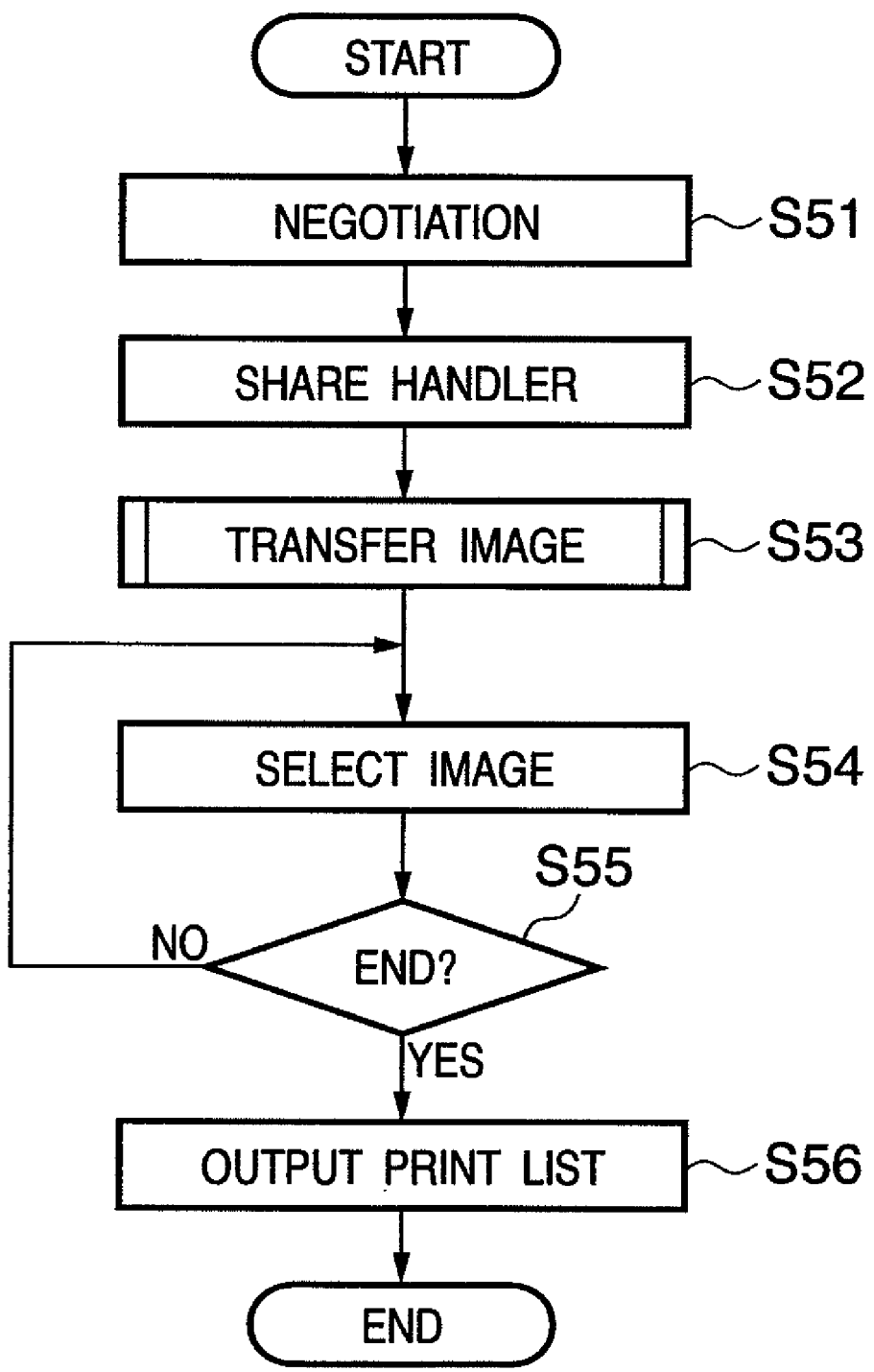
FIG. 10 is a flow chart showing the processing sequence on the digital camera side in the third embodiment.

The processing sequence in the DSC 3012 will be described below with reference to the flow chart of FIG. 10.

Upon connection of the DSC 3012 to the PD printer 1000, a negotiation process is executed in step S51. Then, handlers uniquely assigned to individual images stored in the storage medium 40 in the DSC 3012 are supplied to the PD printer, thus sharing (commonizing) information required to specify images in the DSC (step S52).

The flow then advances to step S53 to output all images stored in the storage medium 40 to the PD printer. In steps S54 and S55, the user selects images to be printed using the liquid crystal display and switch group. In this selection, the user can select a plurality of images. When the user finally issues a print instruction, a list (script) that describes handlers of an image group (one or more images) selected so far is output to the PD printer 1000.

Figure 11:
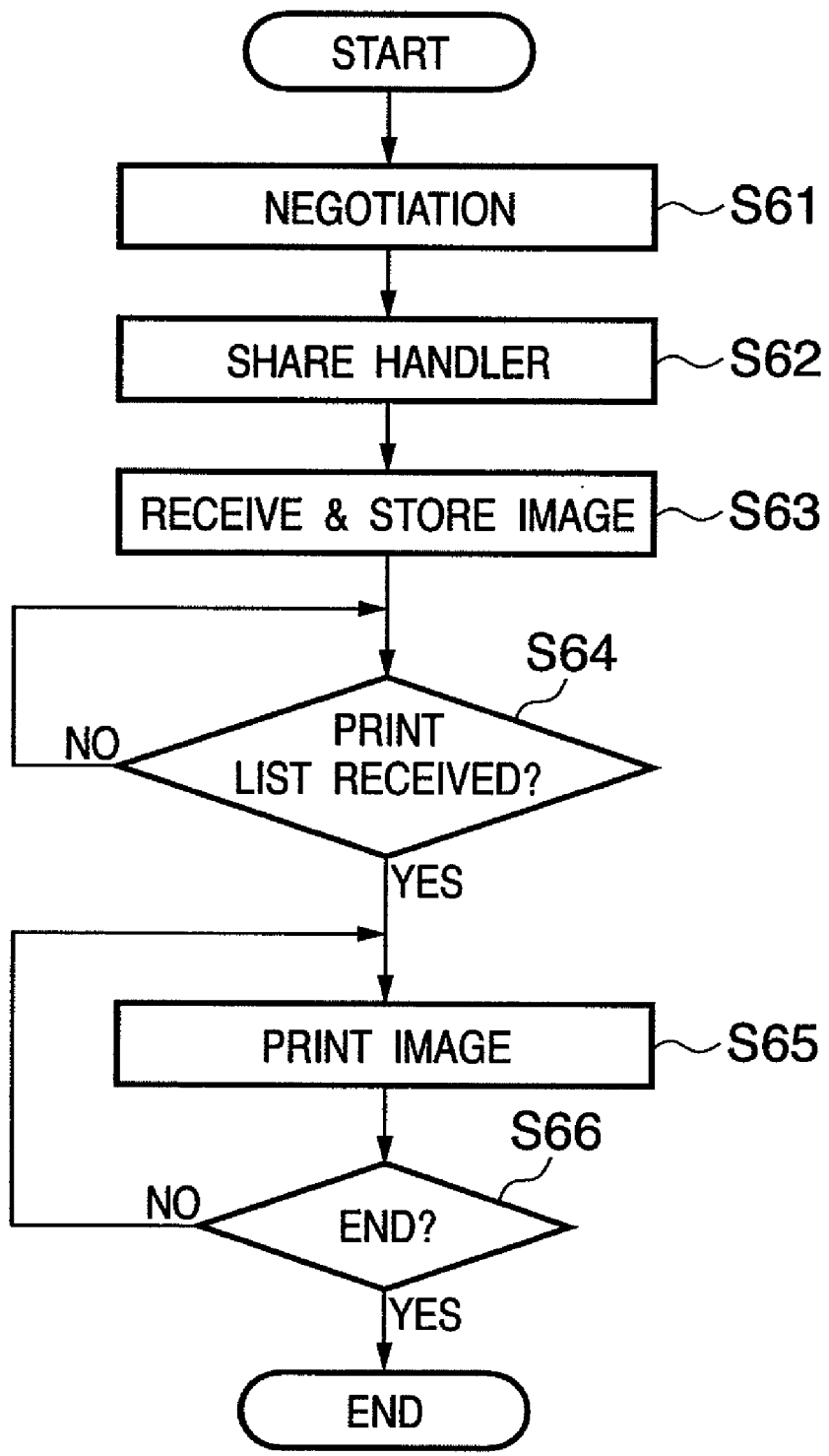
FIG. 11 is a flow chart showing the processing sequence on the print apparatus side in the third embodiment.

The operation processing sequence on the PD printer 1000 is executed in accordance with the flow chart shown in FIG. 11.

In step S61, a negotiation process is executed. In step S62, the handlers of images stored and held by the DSC are received to share information required to specify images.

In step S63, images transferred from the DSC are stored in turn in the storage device 8. In step S64, the control waits for reception of a list that describes the handlers of images to be printed.

Upon reception of this list, the flow advances to step S65. In step S65, one of the handlers described in that list is read out, and a print process of that image is executed. The process in step S65 is repeated until it is determined that the print processes of all images described in the list are complete (step S66).

As described above, according to the third embodiment, in the initial stage of direct connection of the digital camera DSC 3012 to the PD printer 1000, all images stored and held by the DSC 3012 are saved in the PD printer 1000. After the user selects an image to be printed and issues its print instruction on the DSC side, the print process of the designated image is guaranteed.

Upon implementing the function of only the third embodiment, the storage device 8 of the PD printer 1000 need only have a storage capacity equivalent to that of the storage medium 40 of the DSC 3012. In such case, the storage device 8 can comprise a volatile memory. Therefore, a CF card, smart media card, or the like may be used as the storage device 8.

Fourth Embodiment

The fourth embodiment will exemplify a case that can speed up the print process on the PD printer 1000 side.

Normally, sensed images stored in the DSC are compressed by JPEG. As is well known, JPEG is a technique for compressing luminance information in case of a monochrome image, and also color difference information in addition to the luminance information in case of a color image. On the other hand, when an image is printed by a printer, a color image is reproduced using three colors, i.e., yellow, magenta, and cyan as subtractive primary colors, or four colors, i.e., black in addition to these colors. Hence, a color space conversion process is required. Also, a color correction process based on the characteristics of a DSC of each manufacturer is required. Furthermore, a zoom process is required depending on the size of a print sheet used even when an image remains the same, and also depending on the number of images to be printed per print sheet even when the print sheet of the same size is used. Moreover, since image data must be converted into binary information required to control a printhead to eject/not eject inks, a binarization process (for example, error diffusion is known) is required.

In the third embodiment, upon issuing a print instruction of a given image on the DSC side, an image processing result according to the instruction contents is stored and held in the storage device. When another print instruction of that image is issued without changing its setup contents, the previous processing result is used intact. Hence, when the same print condition is set for at least one image, the second and subsequent print processes are speeded up. Upon implementing the third embodiment, the storage device in the PD printer 1000 requires a nonvolatile, large-capacity storage device as in the first embodiment.

Figure 12:
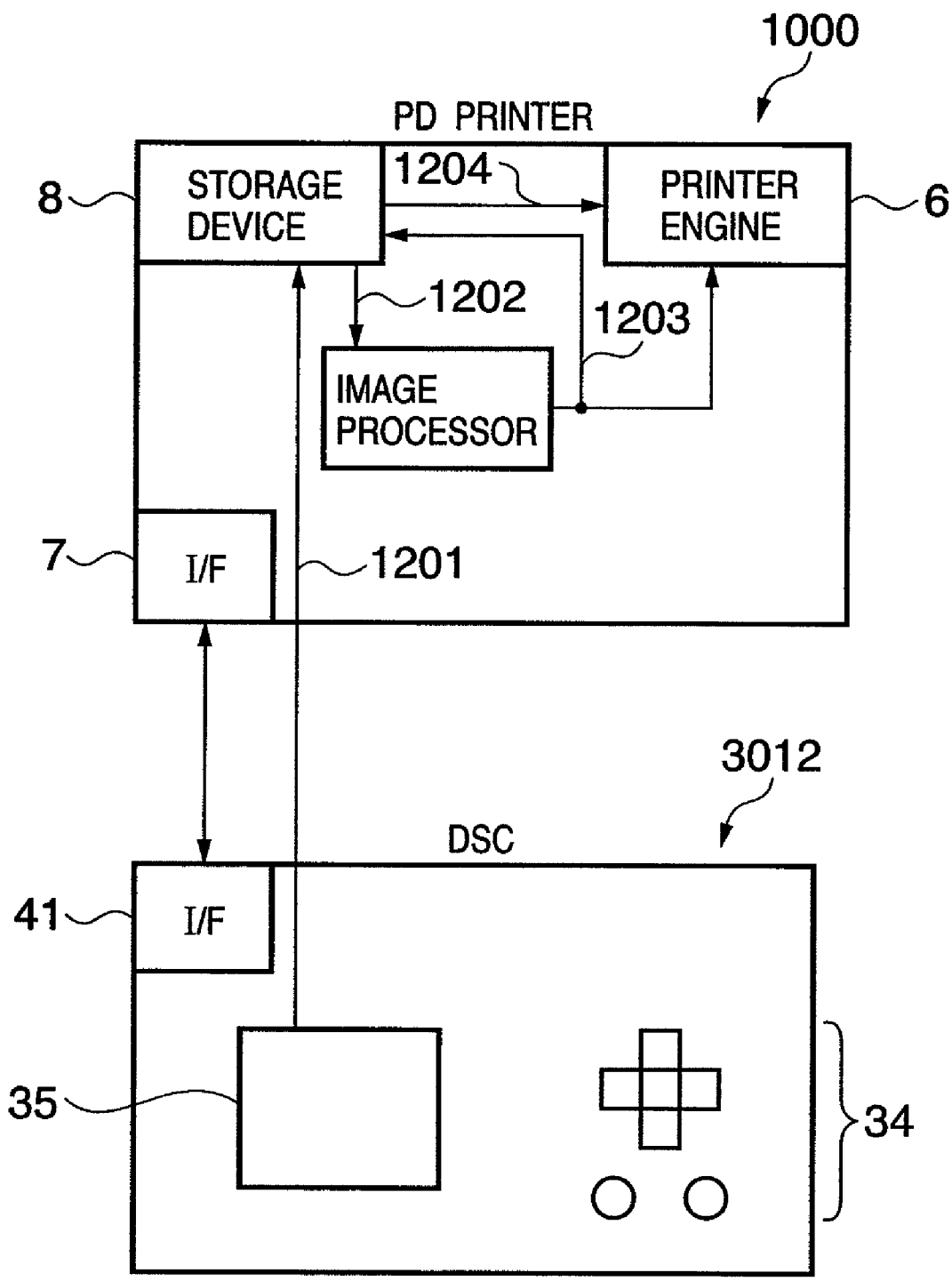
FIG. 12 is a schematic functional diagram in a print system according to the fourth embodiment of the present invention.

FIG. 12 is a schematic functional diagram of the fourth embodiment. The operations illustrated in FIG. 12 will be described below.

When the DSC 3012 is connected to the PD printer 1000, all images stored in the DSC 3012 are stored in the storage device 8 first (reference numeral 1201 in FIG. 12). If the same image as that which has already been saved in the storage device 8 is held in the DSC, that image is not transferred. That is, all images stored in the DSC 3012 are held by the PD printer 1000. The purpose for this transfer process is as has been explained in the third embodiment.

After all images in the DSC 3012 are held in the storage device in the PD printer 1000, images to be printed are selected and their print conditions (a print sheet size, and layout indicating if one or 2×2 images are printed per print sheet) are set using the DSC 3012 as in the third embodiment. Then, a list (script) which describes the handlers of images to be printed, and their conditions is sent to the PD printer 1000.

The PD printer 1000 checks for each individual image based on the received print request if the previous image processing result under the same condition is saved. If it is determined that no such result is saved, a corresponding image process is executed (reference numeral 1202 in FIG. 12), and that result is output to the printer engine 6 and is saved in the storage device 8 (reference numeral 1203 in FIG. 12).

If the previous image processing result is saved in the storage device 8 intact, the corresponding image processed data in the storage device 8 is output to the printer engine 6 to execute its print process (reference numeral 1204 in FIG. 12).

Figure 13:
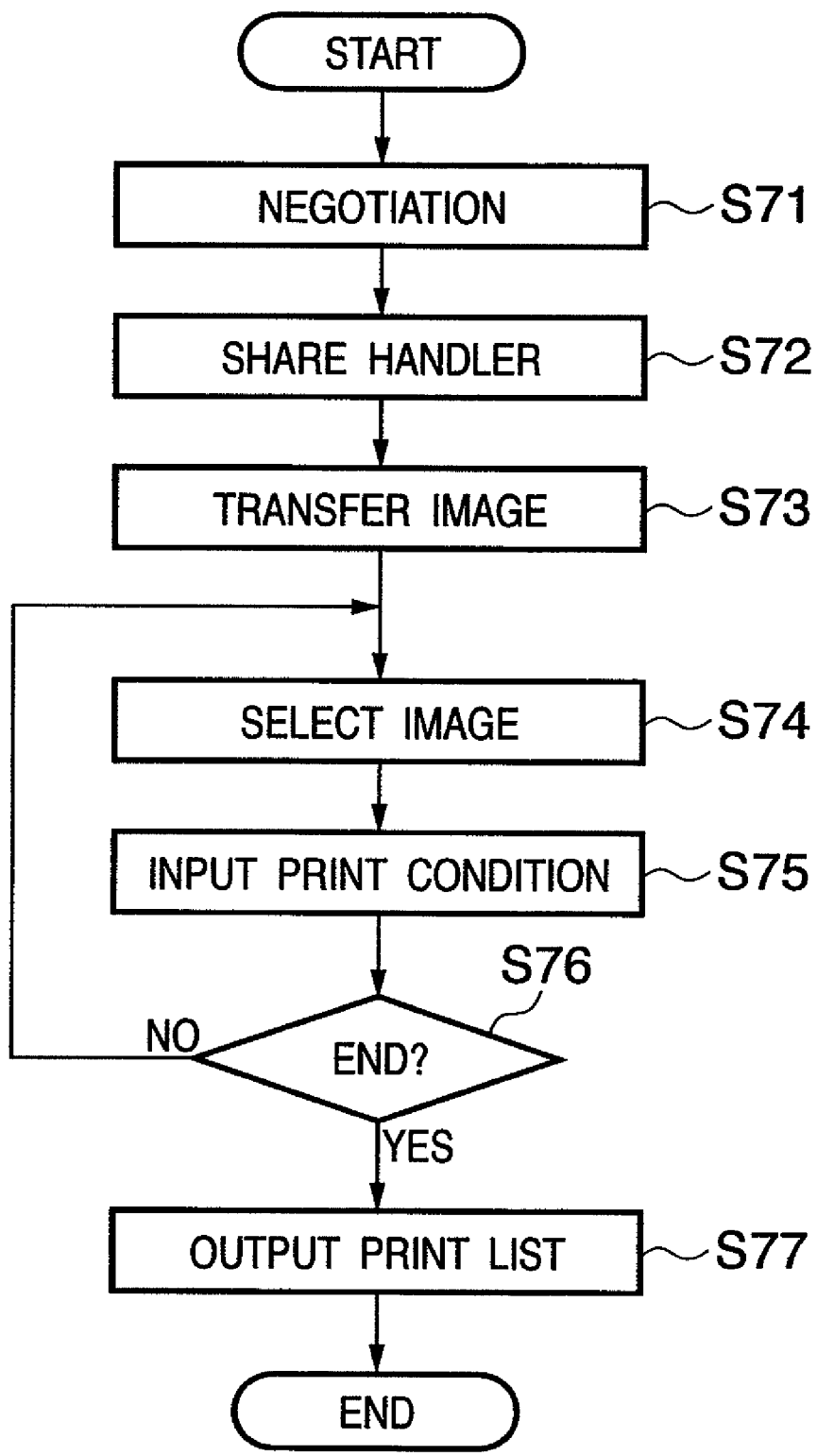
FIG. 13 is a flow chart showing the processing sequence on the digital camera side in the fourth embodiment.
Figure 14:
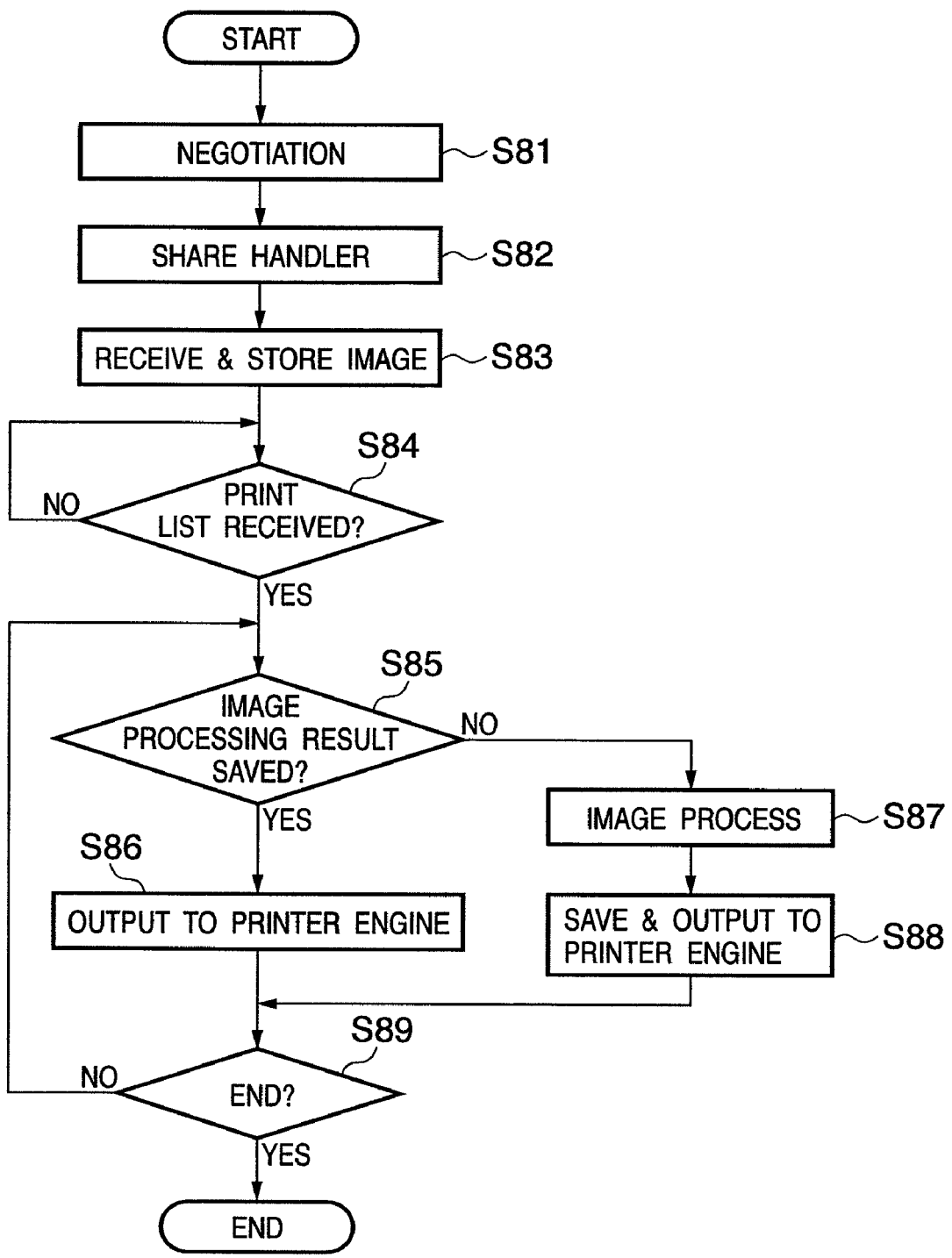
FIG. 14 is a flow chart showing the processing sequence on the print apparatus side in the fourth embodiment.

Upon implementing the above processes, the DSC 3012 and PD printer 1000 can process according to the flow charts shown in FIGS. 13 and 14.

The processing sequence on the DSC side will be described first with reference to FIG. 13.

Upon connection of the DSC 3012 to the PD printer, a negotiation process is executed in step S71. In step S72, handlers as information required to specify images stored and held by the DSC are shared between the DSC 3012 and PD printer 1000. At this time, if original image data (JPEG image data) that have already saved in the storage device 8 are found, the PD printer 1000 informs the DSC of them. Therefore, images which are saved in the storage device 8 of the PD printer are not transferred in an image transfer process in step S73, thus shortening the time required to transfer.

After that, the user selects an image to be printed (step S74) and inputs its print conditions (to designate the image size, layout, print sheet size, and the like upon print) (step S75) in turn using the UI (liquid crystal display 35 and operation switch group 35) of the DSC. In this way, if the user inputs a print instruction using the UI (YES is determined in step S76), a list (script) that describes the handlers and print conditions of images is output to the PD printer (step S77).

The process on the PD printer 1000 side will be described below with reference to the flow chart of FIG. 14.

In step S81, a negotiation process is executed. In step S82, a handler sharing process is executed. At this time, it is checked if images (original JPEG images) stored and held on the DSC 3012 side have already been saved in the storage device 8, and information indicating the presence/absence of such images is transmitted to the DSC. Note that this checking process is done based on photographing date & time information.

In step S83, images transferred from the DSC are saved in the storage device (photographing date & time information is used upon saving images as in the first embodiment). Already saved images are not transferred. That is, since only images taken after the previous printout process are transferred, the processes up to step S83 can be completed within a very short period of time as long as this system is used.

In step S84, the control waits for reception of a print list (a script that describes the handlers indicating images to be printed and their print conditions). Upon reception of this list, the flow advances to step S85 to check if an image processing result under the same conditions as the designated conditions of an image corresponding to the handler of one image in the list is saved in the storage device 8.

If it is determined that the image processing result under the same conditions of the image of interest is saved, that image data is output to the printer engine 6 to execute its print process (S86).

On the other hand, if it is determined that no such image processing result is saved, image processes (zooming, color conversion, and binarization processes) are executed according to the set conditions in step S87. In step S88, that processing result is output to the printer engine 6 and is saved as a file in the storage device 8. Note that the image processing result file, original image, and the processing contents of the image processing result are saved in association with each other. The checking process in step S85 is done by comparing the print conditions designated by the DSC with those for processing result images saved in the storage device 8.

The image processing result file saved in this embodiment need not always store result data that has undergone all image processes, but may store intermediate data. When image information itself has been modified, an image processing result file must be managed independently of an original image file (e.g., to allow a PC to read out that image file). In such case, the generated image processing result file is valid for only the printer, and consumes many storage capacity.

Hence, for example, when the image processes include a "process for analyzing an original image file and executing a specific image process", parameters obtained by a process of generating parameters for the image processes are appended in a format that does not modify original image file. A sequence for generating parameters can be obviated from the next output, and the consumption of the storage capacity can be suppressed.

Furthermore, when the parameters appended to the file have a format that can be commonly used by, e.g., a printer driver on a PC, the effect of the present invention can be enjoyed in broader fields.

Note that a technique for recording information (e.g., a DPOF file or the like) that designates an image to be printed in a digital camera before connecting the digital camera to a printer is already known.

If it is determined that print designation information is recorded in such digital camera, images may be automatically transferred in turn from a print-designated image to a storage medium of the printer after the digital camera is connected to the printer without a print start instruction or a image selecting instruction by a user.

At this time, image data stored in the storage medium of the printer may have already undergone an image process for print. When this image process for print reflects an image process set in the pre-stored print designation information, the print designation information may be helpful to confirm the contents of the image process later.

In this manner, since an image which is more likely to be printed of those in the digital camera can be transferred early, the print process can start earlier than the case wherein all images in the digital camera are transferred.

Since all images need not be transferred, the storage capacity of the storage medium on the printer side can be saved.

As described above, according to the fourth embodiment, the functions and effects as well as those of the first and third embodiments can be provided. Also, when an image which has been previously printed at least once is to be printed under the same conditions, the load on the print process in the PD printer 1000 can be reduced, and the print process can be speeded up.

Even when other conditions are designated, if an original image has already been saved in the storage device in the PD printer 1000, that image is not transferred (the user feels as if transfer were complete instantaneously). Hence, the connection time between the DSC and PD printer can be shortened, and risks of battery shutoff can be lowered.

According to the fourth embodiment, when one image is printed under some different conditions, image processing results corresponding in number to those conditions are stored in the storage device, thus improving the hit rate. In general, since the user rarely sets many different print conditions, such process is more effective.

Since the image processes finally generate an image compatible to a printhead, ink consumption amounts upon printing that image can be determined at that time. This is because the number of times of ink ejection for each of yellow, magenta, cyan, and black components can be counted. These count results are stored in correspondence with the image processed file. As a result, the following control can be made.

Since a technique for detecting an ink remaining amount is a state-of-the-art one, information associated with the ink remaining amount of each color component is acquired in advance. When the image processing result of an image to be printed is stored in the storage device, if the ink use amount of each color component consumed upon printing that image is smaller than the remaining amount, the print process of that image is canceled. Or if the print process is executed, an alert indicating that a normal print process is unlikely to be accomplished is generated. It is desired for such alert means to adopt a user-friendly format. In an environment in which the DSC and PD printer are directly connected as in this embodiment, the liquid crystal display on the DSC side is used for the user's convenience. Hence, that alert message is sent from the PD printer to the DSC, which displays the received message on the UI.

As described above, according to the third and fourth embodiments, when a system that directly connects a digital camera and printer is built, images stored and held in the digital camera are transferred to the printer in the initial stage of their connection. Hence, after the user has issued a print instruction, even when the battery of the digital camera runs out during the print process, the printout processes of the scheduled image (or images) can be completed.

Note that the third and fourth embodiments can be combined with the first embodiment. For example, when the first embodiment is applied to the fourth embodiment, the user can freely browse images in the PD printer by issuing a browse instruction after negotiation. Therefore, by combining the first embodiment with the third and fourth embodiments, the PD printer can be used as an image storage device.

In an environment in which the PD printer of the above embodiment can also be connected to a personal computer (PC), for example, when a PC owner wants to print an image stored in the PD printer on the PC, and data that matches the current print conditions is saved in the PD printer, he or she need only inform the printer of its handler and conditions, thus printing the desired image. To this end, a printer driver which runs on the PC side may include the same operations as the DSC.

Furthermore, in each of the above embodiments, the USB interface and USB cable have been exemplified as connection means between the DSC and PD printer. However, the present invention is not limited to such specific connection means, but other means may be used. For example, wireless communication means (e.g., Bluetooth® or wireless LAN) may be used. Since most of digital cameras comprise a USB interface, and such hardware resource can be utilized intact, USB connection is preferable, and the load on digital camera manufacturers can be reduced.

In the description of each of the above embodiments, the printer apparatus serves as a USB host, and the DSC serves as a USB slave. As described above, in view of the facts that most of recent digital cameras have a USB slave function to communicate with a PC, the number of digital camera manufacturers is larger than that of printer manufacturers, and a host device need not trouble about a power supply, when the printer side serves as a host, the load on the manufacturers can be reduced, the manufacturers can sufficiently enjoy merits upon building a system as the object of the present invention, and such system is preferable for end users.

As described above, according to the present invention, in a system in which a digital camera and printer can directly communicate with each other and a sensed image can be directly printed, sensed images can be saved in the printer. Hence, even when previously sensed images are erased on the digital camera side, images themselves can be avoided from being erased.

As many apparently widely different embodiments of the present invention can be made without departing from the spirit and scope thereof, it is to be understood that the invention is not limited to the specific embodiments thereof except as defined in the claims.

What is claimed is:

1. A print apparatus which has a printing unit for printing an image on a printing medium, comprising:
a storage unit that stores image data;
a communication unit that communicates with a digital camera;
a reception unit that receives, from the digital camera via said communication unit, a job in which information indicating either an instruction of storing an image or an instruction of printing an image is described and image designation information designating the image to be stored or printed is described;
a determination unit that, when said reception unit receives the job from the digital camera, determines whether or not image data of the image specified by the image designation information described in the received job has already been stored in said storage unit;
a preservation processing unit that, if the received job includes an instruction of storing an image and said determination unit determines that the image data of the image designated by the image designation information described in the job has not been stored yet in said storage unit, sends to the digital camera a transfer request of the image data to be stored and stores in said storage unit the image data sent from the digital camera in response to sending the transfer request; and
a print processing unit that, if the received job includes an instruction of printing an image and said determination unit determines that the image data to be printed has already been stored in said storage unit, reads out from said storage unit the image data designated by the image designation information described in the received job without sending to the digital camera the transfer request for sending the image data of the image designated by the image designation information described in the job and executes print processing of the read out image data by the printing unit, and, if the received job includes an instruction of printing an image and said determination unit determines that the image data to be printed has not been stored yet in said storage unit, said print processing unit sends to the digital camera the transfer request for sending the image data of the image designated by the image designation information described in the job and executes the print processing of the image data sent from the digital camera in response to sending the transfer request by the printing unit.

2. The print apparatus according to claim 1, wherein, if the received job includes an instruction of printing an image and said determination unit determines that the image data to be printed has not been stored yet in said storage unit, said storage unit stores the image data sent from the digital camera in response to sending the transfer request.

3. The print apparatus according to claim 1, wherein said determination unit determines whether image data of an image designated by the image designation information described in the received job has been stored in said storage unit using at least one of photographing time information, a file name, a file size, an image format, file creation time information, and identification information calculated from the image data.

4. The print apparatus according to claim 1, further comprising a unit that stores, in said storage unit, image data of images having been held by the digital camera and having not been stored yet in said storage unit at an initial stage when the print apparatus and the digital camera are connected directly.

5. A method of controlling a print apparatus which has a printing unit for printing an image on a printing medium, a communication unit that communicates with a digital camera and a storage unit that stores image data, said method comprising:
a reception step of receiving, from the digital camera via the communication unit, a job in which information indicating either an instruction of storing an image or an instruction of printing an image is described and image designation information designating the image to be stored or printed is described;
a determination step of, when the job from the digital camera is received in said reception step, determining whether or not image data of the image specified by the image designation information described in the received job has already been stored in the storage unit;
a preservation processing step of, if the received job includes an instruction of storing an image and said determination step determines that the image data of the image designated by the image designation information described in the job has not been stored yet in the storage unit, sending to the digital camera a transfer request of the image data to be stored and storing in the storage unit the image data sent from the digital camera in response to sending the transfer request; and
a print processing step of, if the received job includes an instruction of printing an image and said determination step determines that the image data to be printed has already been stored in the storage unit, reading out from the storage unit the image data designated by the image designation information described in the received job without sending to the digital camera the transfer request for sending the image data of the image designated by the image designation information described in the job and executing print processing of the read out image data by the printing unit, and, if the received job includes an instruction of printing an image and said determination step determines that the image data to be printed has not been stored yet in the storage unit, said print processing step sends to the digital camera the transfer request for sending the image data of the image designated by the image designation information described in the job and executes the print processing of the image data sent from the digital camera in response to sending the transfer request.

6. The method according to claim 5, wherein, if the received job is an instruction of printing an image and said determination step determines that the image data to be printed has not been stored yet in the storage unit, the image data sent from the digital camera in response to sending the transfer request is stored in the storage unit.

7. The method according to claim 5, wherein said determination step determines whether image data of an image designated by the image designation information described in the received job has been stored in the storage unit using at least one of photographing time information, a file name, a file size, an image format, file creation time information, and identification information calculated from the image data.

8. The method according to claim 5, further comprising a step of storing, in the storage unit, image data of images having been held by the digital camera and having not been stored yet in the storage unit at an initial stage when the print apparatus and the digital camera are connected directly.

* * * * *